United States Patent
Lin et al.

(10) Patent No.: US 10,964,049 B2
(45) Date of Patent: Mar. 30, 2021

(54) METHOD AND DEVICE FOR DETERMINING POSE OF CAMERA

(71) Applicant: Baidu Online Network Technology (Beijing) Co., Ltd, Beijing (CN)

(72) Inventors: Yuan Lin, Beijing (CN); Yongjie Zhang, Beijing (CN); Sili Chen, Beijing (CN); Hongwu Zhang, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 208 days.

(21) Appl. No.: 16/145,540

(22) Filed: Sep. 28, 2018

(65) Prior Publication Data

US 2019/0206078 A1 Jul. 4, 2019

(30) Foreign Application Priority Data

Jan. 3, 2018 (CN) .......................... 201810005054.5

(51) Int. Cl.
| | |
|---|---|
| *G06K 9/00* | (2006.01) |
| *G06T 7/73* | (2017.01) |
| *G06T 7/277* | (2017.01) |
| *G06T 7/33* | (2017.01) |

(52) U.S. Cl.
CPC .............. *G06T 7/73* (2017.01); *G06T 7/277* (2017.01); *G06T 7/74* (2017.01); *G06T 7/33* (2017.01); *G06T 2207/20081* (2013.01); *G06T 2207/30204* (2013.01); *G06T 2207/30244* (2013.01)

(58) Field of Classification Search
None
See application file for complete search history.

(56) References Cited

U.S. PATENT DOCUMENTS

| 9,361,687 B2 * | 6/2016 | Shimoda ................... G06T 7/80 |
| 9,542,745 B2 * | 1/2017 | Moteki ...................... G06T 7/70 |
| 10,147,192 B2 * | 12/2018 | Moteki ....................... G06T 7/73 |
| 2012/0075343 A1 * | 3/2012 | Chen .......................... G06T 7/73 |
| | | 345/633 |
| 2014/0160115 A1 * | 6/2014 | Keitler ................. H04N 9/3185 |
| | | 345/419 |

(Continued)

FOREIGN PATENT DOCUMENTS

| CN | 103218799 A | 7/2013 |
| CN | 103988226 A | 8/2014 |
| CN | 106056664 A | 10/2016 |

(Continued)

OTHER PUBLICATIONS https://www.cnblogs.com/gaoxiang12/p/5689927.html, Direct Method, Jul. 20, 2016.

(Continued)

*Primary Examiner* — Soo Jin Park
(74) *Attorney, Agent, or Firm* — Akerman LLP

(57) ABSTRACT

A method for determining a pose of a camera is provided, the method includes: S101, acquiring an image of a marker; S102, estimating a first pose of the camera according to the image of the marker by a characteristic point method; S103, estimating a second pose of the camera according to the image of the marker by a direct method; and S104, determining the pose of the camera based on the first pose and the second pose.

14 Claims, 4 Drawing Sheets

(56) References Cited

U.S. PATENT DOCUMENTS

2015/0310617 A1* 10/2015 Hara ................. H04N 5/23293
  345/633

FOREIGN PATENT DOCUMENTS

| CN | 106846417 A | 6/2017 |
|---|---|---|
| CN | 106885574 A | 6/2017 |
| CN | 106934827 A | 7/2017 |
| CN | 107025668 A | 8/2017 |
| EP | 2535869 A2 | 12/2012 |

OTHER PUBLICATIONS http://blog.csdn.net/danmeng8068/article/details/76818885, Visual odometer feature point method, Aug. 7, 2017.
Search Report dated Feb. 2, 2019 in connection with corresponding Chinese Patent Application No. 201810005054.5.
Office Action dated Feb. 19, 2019 in connection with corresponding Chinese Patent Application No. 201810005054.5.
Non-Patent Literature document 1 with English language summary.
Non-Patent Literature document 2 with English language summary.
Office Action dated Jan. 2, 2019 issued in connection with corresponding Chinese Patent Application No. 201810005054.5.
Search Report dated Dec. 24, 2018 issued in connection with corresponding Chinese Patent Application No. 201810005054.5.
Zhang, Guoliang et al., Fast Binocular SLAM Algorithm Combining the Direct Method and the Feature-based Method, ROBOT, vol. 39, No. 6, Nov. 2017.
Office Action issued in connection with corresponding Chinese Patent Application No. 201810005054.5.
Search Report issued in connection with corresponding Chinese Patent Application No. 201810005054.5.

* cited by examiner

METHOD AND DEVICE FOR DETERMINING POSE OF CAMERA

CROSS-REFERENCE TO RELATED APPLICATION

This application claims priority to Chinese Patent Application No. 201810005054.5, filed on Jan. 3, 2018, which is hereby incorporated by reference in its entirety.

FIELD OF THE DISCLOSURE

The disclosure generally relates to the field of computer vision, and more particularly to a method and device for determining a pose of a camera.

BACKGROUND OF THE DISCLOSURE

Computer vision is a hotspot in current industry and scientific research. Augmented Reality (AR), for example, is a variation of virtual reality (VR), by which a virtual object is overlapped or combined into the real world. Therefore, AR is a technology that merges a virtual world with the real world together.

In the field of AR, a pose of a camera needs to be estimated in real-time to ensure real-timeness, stability and robustness of the overlapped images. For example, the pose of the camera for capturing an image is determined by tracking a particular planar marker in the image. The method of tracking the marker can be used for tracking the pose of the camera in augmented reality (AR). This pose can be directly used for virtual object rendering in AR. Similarly, indoor navigation, AR advertising, AR star interaction may all be achieved with this technology.

The marker refers to a fixed planar marker used for marking and used for the AR, and may be a planar object such as a poster, a display board, a book, or a floor sticker.

At present, tracking based on a fixed marker is mostly triggered by an indirect method (characteristic point+descriptor), and is conducted by an algorithm such as an optical flow method, a region matching or the like.

The tracking methods in the existing technology have the following drawbacks:

these methods have high requirements on the spatial density of characteristic corner points and the distinguishability of characteristics;

since the environmental information is unknown, the anti-interference ability for complicated background is poor only based on marker information; and model matching and tracking are prone to failure when the model has a small proportion in the field of view.

The above is only the technical condition known to the inventor, and does not necessarily means that it constitutes the existing technology of the present disclosure.

SUMMARY OF THE DISCLOSURE

In view of one or more of the problems existing in the existing technology, a method for determining a pose of a camera is provided according to the present disclosure, the method includes: S101, acquiring an image of a marker; S102, estimating a first pose of the camera according to the image of the marker by a characteristic point method; S103, estimating a second pose of the camera according to the image of the marker by a direct method; and S104, determining the pose of the camera based on the first pose and the second pose.

According to an aspect of the present disclosure, the step S104 includes: determining the second pose of the camera as the pose of the camera, in a case that a deviation between the first pose and the second pose is less than a preset threshold; and determining the first pose of the camera as the pose of the camera, in a case that the deviation between the first pose and the second pose is greater than the preset threshold.

According to an aspect of the present disclosure, the step S104 includes: determining the pose of the camera by weighting the first pose and the second pose.

According to an aspect of the present disclosure, the method further includes: determining whether the first pose and the second pose are available respectively.

According to an aspect of the present disclosure, it is determined whether the first pose is available by calculating a point-to-point re-projection error; and it is determined whether the second pose is available by calculating a photometric error.

According to an aspect of the present disclosure, the method further includes: determining the first pose of the camera as an initialized pose of the camera, and performing the S103, in a case that the second pose is unavailable.

According to an aspect of the present disclosure, the method further includes: determining a region of interest based on the second pose, and estimating the first pose of the camera in the region of interest.

According to an aspect of the present disclosure, the marker is a planar marker, and the method further includes: performing characteristic extraction and characteristic training on a template image of the marker.

According to an aspect of the present disclosure, the step S102 includes: matching a characteristic point of the image of the maker to a characteristic point of the template image of the maker, to estimate the first pose of the camera.

According to an aspect of the present disclosure, the marker is a three-dimensional marker, and the step S102 includes: matching the image of the maker to a characteristic template of the maker, to estimate the first pose of the camera.

A non-volatile computer readable storage medium is also provided according to the present disclosure, the non-volatile computer readable storage medium includes computer executable instructions stored thereon, wherein the computer executable instructions, when executed by a processor, implement the method as described above.

A device for determining a pose of a camera is also provided according to the present disclosure, the device includes: a unit configured to acquire an image of a marker; a unit configured to estimate a first pose of the camera according to the image of the marker by a characteristic point method; a unit configured to estimate a second pose of the camera according to the image of the marker by a direct method; and a unit configured to determine the pose of the camera based on the first pose and the second pose.

A device is also provided according to the present disclosure, the device includes: a camera; a processor, the processor being in communication with the camera and being able to receive or access an image captured by the camera; and a memory including computer executable instructions stored thereon, wherein the computer executable instructions, when executed by the processor, implement the method as described above.

Through at least some embodiments of the present disclosure, in the process of tracking a pose of a camera, poses of the camera are estimated by both the direct method and the characteristic point method so that the pose of the camera can be calculated more accurately.

BRIEF DESCRIPTION OF THE DRAWINGS

The accompanying drawings are intended to provide a further understanding of the disclosure, and constitute a part of the description of the disclosure; they serve to explain the disclosure together with the embodiments of the disclosure, and do not limit the disclosure. In the drawings.

DETAILED DESCRIPTION OF THE EMBODIMENT(S) OF THE DISCLOSURE

Figure 1:
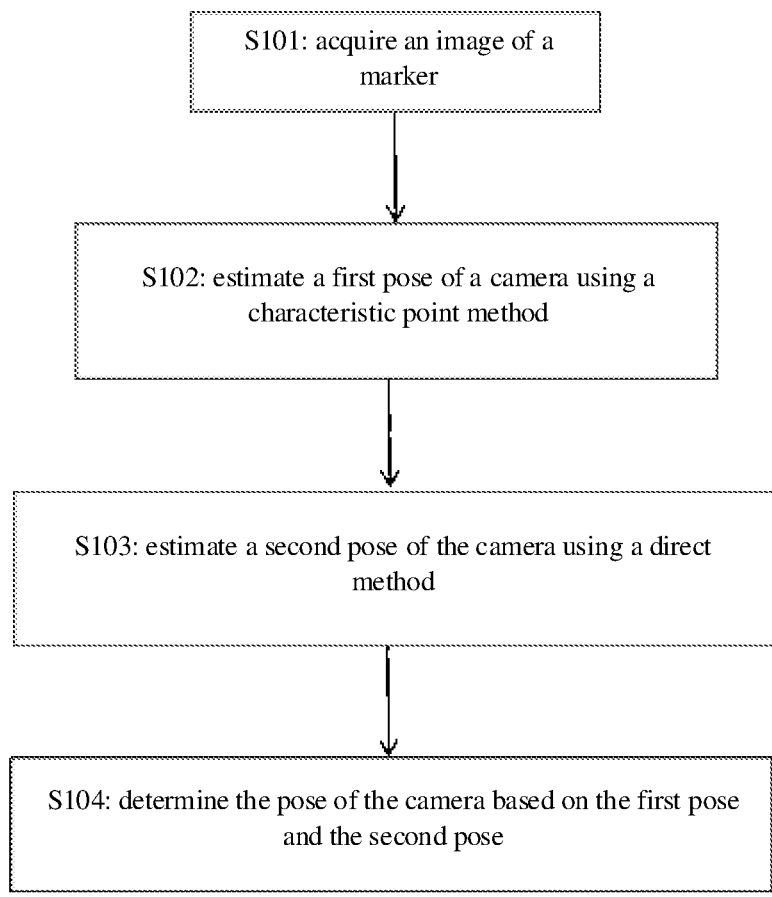
FIG. 1 illustrates a method for determining a pose of a camera according to a first embodiment of the present disclosure.

Hereinafter, only some exemplary embodiments are simply described. As can be recognized by those skilled in the art, the described embodiments may be modified in various different ways without departing from the spirit or scope of the present disclosure. Accordingly, the drawings and the description should be considered as illustrative in nature instead of being restrictive.

In the description of the present disclosure, it is to be understood that orientations or positional relationships indicated by terms "center", "longitudinal", "transverse", "length", "width", "thickness", "upper", "lower", "front", "rear", "left", "right", "vertical", "horizontal", "top", "bottom", "inner", "outer", "clockwise", "counterclockwise" or the like are based on the orientations or positional relationships shown in the drawings. The terms are presented merely for facilitating describing the disclosure and simplifying the description, and do not indicate or imply that the device or element that is referred to must have a specific orientation or is constructed and operated in a specific orientation. Therefore, they should not be construed as limiting the disclosure. Furthermore, terms "first" and "second" are used for descriptive purposes only, and are not to be construed as indicating or implying relative importance or implicitly indicating the number of recited technical features. Thus, a feature defined with "first" and "second" may include one or more said feature, either explicitly or implicitly. In the description of the present disclosure, the meaning of "a plurality" is two or more than two, unless otherwise explicitly or specifically indicated.

In the description of the present disclosure, it should be noted that terms "install", "connect", and "couple" are to be understood broadly, and may for example refer to a fixed connection or a detachable connection, or an integral connection; it may also refer to a mechanical connection, an electrical connection, or communication with each other; it can be a direct connection, or an indirect connection through an intermediate medium, which can be internal communication of two elements or mutual interaction relationship of two elements. The specific meanings of the above terms in the present disclosure can be understood by those skilled in the art according to the specific condition.

In the present disclosure, unless otherwise explicitly specified or defined, the expression of the first feature "on" or "under" the second feature may include direct contact of the first and second features, or indirect contact of the first and second features, in which case the first feature contacts with the second feature through an additional feature between them. Moreover, the expression of the first feature "on", "above" or "over" the second feature includes the first feature being right on, above or over the second feature or diagonally on, above or over the second feature, or merely indicates that the first feature is located at a higher level than the second feature. The expression of the first feature "under", "below" or "beneath" the second feature includes the first feature being right under, below or beneath the second feature or diagonally under, below or beneath the second feature, or merely indicates that the first feature is located at a lower level than the second feature.

The following disclosure provides many different embodiments or examples for implementing different structures of the present disclosure. In order to simplify the disclosure, the components and arrangements of the specific examples are described below. Of course, they are merely examples and are not intended to limit the disclosure. In addition, reference numerals and/or reference letters may be repeatedly referred to in different examples, and such repetition is for the purpose of simplicity and clarity, and does not indicate the relationship among the various embodiments and/or arrangements discussed. Moreover, the present disclosure provides examples of various specific processes and materials, but those skilled in the art can recognize the application of other processes and/or the use of other materials.

The preferred embodiments of the present disclosure are described below with reference to the accompanying drawings. It should be understood that the preferred embodiments described herein are merely intended to illustrate and explain the disclosure, and are not intended to limit the present disclosure.

FIG. 1 illustrates a method for determining a pose of a camera according to a first embodiment of the present disclosure. The method for determining the pose of the camera will be described below in detail with reference to FIG. 1.

In step S101, an image of a marker is acquired. The marker may be, for example, a planar marker. The marker may be an easily recognizable marker placed in a real scene, including a planar object such as a poster, a display board, a book, a floor sticker, etc. Typically, a planar marker can be used as a positioning reference, such as a rectangular parallelepiped, a circular ring, a bar code, etc., which serves as a tracking reference. By recognizing the marker in the image and processing the image containing the marker, the pose of the camera is estimated. The marker may also be a three-dimensional (3D) marker. The above description are within the scope of the disclosure.

In step S102, a first pose of a camera is estimated according to the image of the marker by using a characteristic point method. In an embodiment, a characteristic point may refer to a specific position point, such as a corner point, an intersection point, etc., or may be a point abstracted from a positional region, which is used to determine a correspondence of the same position in two images to align the images. For a 3D marker, a tracking method based on a 3D object and a method for determining a pose of a camera based on the characteristic point method are also a common method.

According to an embodiment of the present disclosure, the marker is a planar marker. A characteristic-point of an image of the planar marker is matched to a characteristic-point of a template image of the planar marker, thereby determining and tracking a pose of a camera. In an embodiment of the present disclosure, the marker is the 3D marker. An image of the 3D marker is matched to a characteristic template of the 3D marker (characteristic points in a 3D space+descriptors).

In theory, each image corresponds to one pose of the camera. A template image corresponds, for example, to a standard pose of the camera. A characteristic point of the acquired image is matched to a characteristic point of the template image, so as to obtain a spatial geometric mapping relationship therebetween, and determine the pose of the camera corresponding to the acquired image. For example, the template image of the marker is used for characteristic extraction and characteristic training. The characteristic points and descriptors are extracted from the template image of the marker, which are matched with information of the acquired image of the marker to determine a pose of the camera. Taking a city map as an example, the pose of the camera is tracked based on a city map which is used for a marker. Characteristic points, such as corner points, are extracted from the template image, then the descriptor of each characteristic point is calculated, and then information including the characteristic points and their descriptors is stored. For the convenience of representation, the information is recorded as a template training file. Subsequently, tracking needs to be performed based on the city map (this part is generally responsible by an image recognition program). Characteristic points are extracted from a current acquired image, and their descriptors are calculated, to be matched to the previously stored template training file. A pose of the acquired image (i.e., the pose of the camera) is determined based on matching information. For the three-dimensional marker, for example, the three-dimensional object characteristic template (characteristic points in the 3D space+descriptors) may be matched to the characteristic points extracted from the acquired image and their descriptors, and the pose of the camera is estimated by using the PNP. According to an embodiment of the disclosure, the pose of the camera may be defined, for example, by six degrees of freedom, including coordinates (tx, ty, tz) in a spatial xyz coordinate system and angles (row, pitch, yaw) of the camera relative to respective axes of xyz.

In the above method, the first pose of the camera is estimated by mapping characteristic points of the acquired image and those of the template image. According to another embodiment of the present disclosure, a pose of the camera may also be determined based on information of a previous frame. The above description are within the scope of the disclosure.

Step S102 can be executed by using various descriptors for a characteristic point including, but not limited to, SIFT, SURF, Signature, Daisy, Brief, etc., or any combination thereof.

In step S103, a second pose of the camera is estimated according to the image of the marker by using a direct method.

The direct method may estimate the motion of the camera directly based on brightness information of pixels in the image, instead of a characteristic point and its descriptor. In this way, not only the time for extraction of a characteristic point and calculation of its description is saved, but also a situation of lack of a characteristic point is avoided. The direct method can work as long as there is a brightness change in the scene. The brightness change may be a gradual change, and does not form a local image characteristic. As compared to the characteristic point method, the direct method may calculate the motion of the camera directly from the pixel information of the images, in which a characteristic point is not required to be extracted and then characteristic-point matching is not required to be performed.

Those skilled in the art can understand that an execution sequence of step S102 and step S103 is not limited, wherein step S102 and step S103, or step S103 and step S102 may be sequentially executed, or steps S102 and S103 may also be executed synchronously, which are all within the scope of protection of the disclosure.

In step S104, the pose of the camera is determined based on the first pose and the second pose.

According to various embodiments of the present disclosure, the pose of the camera may be determined based on the first pose and the second pose, for example, by linear weighting or non-linear weighting. Kalman filtering fusion is applied to poses estimated from previous and current frames. For example, Kalman filtering is applied to the spatial coordinates (Tx, Ty, Tz) and the angles (roll, pitch, yaw) estimated from the previous and current frames. For example, the above six parameters may be taken as independent components, and each of them is then subject to a first-order Kalman filtering so as to eliminate the jittering. The linear weighting is to apply different weighting coefficients to a pose estimated from the previous frame and another pose estimated from the current frame respectively for fusion. The weighting coefficients may be obtained from a database in which poses are defined and by evaluating results of executing an algorithm under different parameters. Non-linear weighting can filter some singularities, such as by adding a truncation function.

According to an embodiment of the present disclosure, when a deviation between the first pose and the second pose is less than a preset threshold, the second pose of the camera is determined as the pose of the camera. When the deviation between the first pose and the second pose is greater than the preset threshold, the first pose of the camera is determined as the pose of the camera. For example, the deviation between the first pose and the second pose is calculated according to the six degrees of freedom of the first pose and those of the second pose of the camera in the way of weighting (as shown in the following formula 1). The calculated deviation is compared with a preset threshold. When the deviation is greater than the preset threshold, the first pose is determined as the pose of the camera. When the deviation is less than the preset threshold, the second pose is determined as the pose of the camera.

$$e = \Sigma_0^5 w_i d_i \qquad \text{formula 1}$$

where e indicates the deviation between the first pose and the second pose; $d_i$ indicates deviations of the first pose and the second pose in six degrees of freedom, i.e., the spatial coordinates (Tx, Ty, Tz) and the angels (roll, pitch, yaw) respectively. $w_i$ is weighting coefficients.

The preset threshold and weighting coefficients may be set according to actual conditions.

According to a preferred embodiment of the present disclosure, the method for determining the pose of the camera further includes performing characteristic extraction and characteristic training on a template image of the marker. The template image is, for example, a front view of the marker in a well-lit, unshielded situation, such as a high-definition design base graph. Based on the template image, a valid characteristic point of the marker can be extracted and a descriptor thereof may be calculated to facilitate subsequent characteristic-point matching. Taking a poster as an example, an ORB characteristic is extracted by detecting a corner point using FAST. Characteristic training is a process of calculating an ORB descriptor. The goal is to obtain a characteristic description that is robust for the pose, which is used to determine an absolute pose of a camera. For example, for the electronic image of a poster, the three directions of the world coordinate system in which the camera is located and the center of the world coordinate system are determined. For example, the plane of the image is made coincide with the x-y plane of the world coordinate system, and the center of the image is regarded as the origin of the world coordinate system. The characteristic points and descriptors that are robust under each pose are selected and recorded, that is, the process of characteristic training and generating a characteristic template is completed. In this way, in the test phase, even if the image of the poster captured by the camera for the first time has a certain translation and rotation, these offsets can be accurately estimated by using the characteristic template, to render the virtual object.

After the characteristic extraction and characteristic training are performed on the template image of the marker, a characteristic point of the image of the marker is matched to a characteristic point of the template image of the marker to obtain the first pose of the camera, in step S102.

A method for determining a pose of a camera in accordance with a second embodiment of the present disclosure will be described below with reference to FIG. 2.

Figure 2:
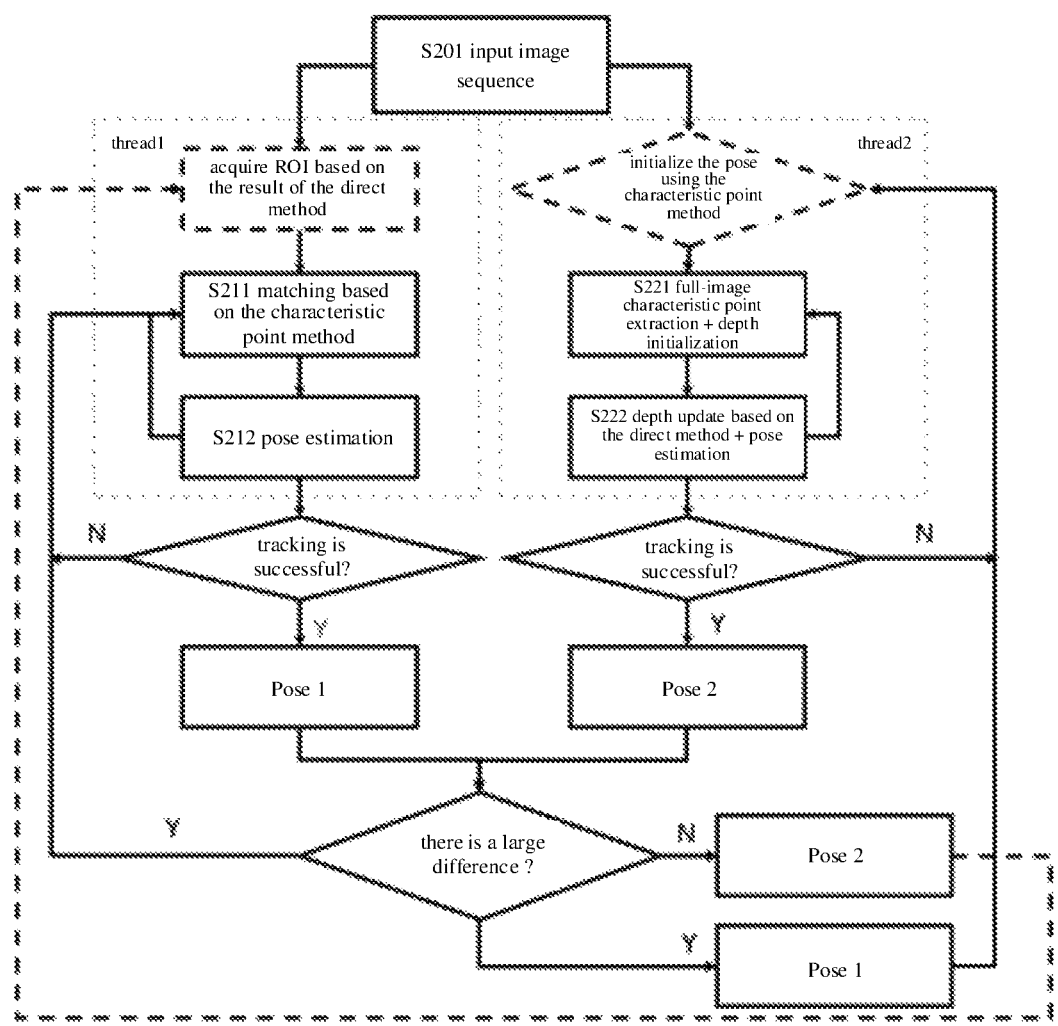
FIG. 2 illustrates a method for determining a pose of a camera according to a second embodiment of the present disclosure.

As shown in FIG. 2, in step S201, an input image sequence of the marker is received. The input image sequence includes multiple input images.

After receiving the input image sequence of the marker, the method for determining a pose of a camera may calculate the first pose and the second pose of the camera by the characteristic point method and the direct method, respectively. In FIG. 2, the calculation processes using the characteristic point method and the direct method are shown by two broken-line boxes of thread 1 and thread 2, respectively. In a specific implementation, the two threads may be performed synchronously or sequentially, and all these are within the scope of the present disclosure. Of course, synchronous processing can shorten a time of image processing and improve the real-timeness of the system. Threads 1 and 2 are described separately below.

In thread 1, in step S211, a characteristic point of an input image of the marker is extracted and matched. The present disclosure is not limited to a method of characteristic-point extraction and matching. For example, a characteristic point may be extracted by using any one of Harris corner point detection, SIFT speckle detection method, KFT, SUSAN, CenSurE, FAST, MSER, and SURF. In step S212, a pose of the camera is estimated. In accordance with an embodiment of the present disclosure, a characteristic point of the input image of the marker is matched to that of the template image of the marker to estimate a first pose of the camera. In this case, characteristic extraction and characteristic training are required to be performed on the template image of the marker in advance.

In thread 2, in step S221, full-image characteristic point extraction is performed on the input image of the marker, and preferably depth initialization may be performed. In commonly used direct method such as DSO, only fast corner points are extracted as characteristic points, and there is no need to calculate descriptors. Depth initialization and update manners are the most common manners used in direct methods (see the LSD method). Taking LSD-SLAM as an example, it creates a semi-dense inverse depth map, which performs depth estimation only for a pixel position with an obvious gradient and represents the estimated result with an inverse depth. It is assumed that the inverse depth conforms to the Gaussian distribution. Once an image frame is selected as a key frame, a depth map of a reference frame that the key frame follows is used to create a depth map of the key frame. Then, all subsequent image frames that the key frame follows will be used to update the depth map of the key frame. Of course, for a frame acquired firstly, there is definitely no depth map by using the above method. Thus, the depth map of the first frame includes a depth randomly generated by regions with obvious gradients. Generally, the thread of creation of the depth map can be divided into two cases: 1. in case of creating a key frame, a new depth map is created (Depth Map Creation) (described in S221); 2. in case of not creating the key frame, the depth map of the key frame is updated (Depth Map Refinement) (described in S222). The initialization is to better track the pose of the camera.

In step S222, a pose of the camera is estimated by the direct method, and the depth is updated.

After estimating the pose of the camera by the characteristic point method, it is necessary to determine whether the pose estimated by the characteristic point method was available. In accordance with an embodiment of the present disclosure, a point-to-point re-projection error may be calculated to determine whether tracking the pose of the camera by the characteristic point method is successful. For example, a threshold may be set. When the point-to-point re-projection error is less than the threshold, it is determined that the pose of the camera estimated by the characteristic point method was available, and this pose is determined as the first pose of the camera (i.e., pose 1).

In the direct method, since there is no matching point pair, the re-projection error cannot be calculated. However, for example, a photometric error can be used to determine whether tracking the pose of the camera using the direct method is successful. The photometric error is a gray difference of two pixels associated by a transformation matrix in two images. Ideally, the gray difference of the pixels should be 0, and the pixels should indicate the same point (based on an assumption that the gray scale does not change). However, in practice, some difference may be caused due to the inaccuracy of the transformation matrix of the pose of the camera. On this basis, a non-linear optimization may be performed on the pose of the camera. The sum of squares of photometric errors of a large number of pixel points is taken as a total error, and the pose of the camera is optimized to minimize the total error. The calculated total error is compared with a threshold. When the total error is less than the threshold, tracking using the direct method is determined to be successful. Otherwise, it is determined that tracking using the direct method has failed.

For a pose estimation by the characteristic point method, if the tracking fails, the process returns to step S211, and characteristic-point matching is performed based on an image of the next frame. For pose estimation by the direct method, if the tracking fails, the pose of the camera is initialized based on the pose estimated by the characteristic point method of the thread 1, and the pose estimation is performed again by the direct method.

In a case that both tracking by the characteristic point method and tracking by the direct method are successful, the pose of the camera estimated by the characteristic point method is taken as the first pose, and the pose of the camera estimated by the direct method is taken as the second pose, and it is determined whether there is a large deviation between the first pose and the second pose. For example, the pose of the camera has six degrees of freedom. The deviation between the first pose and the second pose may for example be calculated by weighting, and then the deviation is compared with a threshold to determine whether there is a large deviation between the first pose and the second pose.

Next, when the deviation between the first pose and the second pose is less than or equal to a preset threshold, the second pose (pose 2) of the camera is taken as the pose of the camera. When the deviation between the first pose and the second pose is greater than the preset threshold, the first pose (pose 1) of the camera is taken as the pose of the camera.

In the latter case, that is, when there is a large deviation between the poses of the camera estimated by the characteristic point method and the direct method, the first pose (pose 1) is taken as the initialized pose of the camera in the thread 2. On this basis, the pose of the camera is calculated again by the direct method, and the tracking using the characteristic point method is performed again in the thread 1. In an embodiment of the disclosure, the characteristic points of the image in the direct method and the current pose of the camera can be adjusted accordingly, thus keeping the consistency of thread 1 and thread 2 (consistency in the scale and the characteristic points of the image). In the former case, that is, when the deviation between the poses of the camera estimated by the characteristic point method and the direct method is smaller than the preset threshold, the ROI (region of interest) identified by the direct method in thread 2 can be provided to thread 1. If processed in this way, when characteristic-point matching is performed later, it is possible to perform characteristic point extraction and matching only in the ROI, thereby reducing the amount of calculation and improving the calculation precision.

Regarding the synchronization of thread 1 and thread 2, one processing method is that the thread 1 for each image frame is synchronized with the thread 2 thereof, and the next operation is performed after both thread 1 and thread 2 are completed. After the first frame or the thread 2 fails to track and before the thread 2 succeeds in tracking, the thread 1 is first calculated to initialize the thread 2. A new image frame is then processed based on this.

Another way is to add relocation in thread 2 on the basis of the above process. After thread 2 succeeds in tracking and then fails to track again, and before thread 1 gives the result for initialization of thread 2, thread 2 outputs a result by the way of relocation.

The above embodiment may include, for example, two threads.

Thread 1 is used for matching by the indirect method (characteristic point method), to output pose 1, which is recorded as a first pose.

Thread 2 is used for tracking by the direct method, to output pose 2, which is recorded as a second pose.

When threads 1 and 2 are successfully completed, their results are merged. In an implementations, the first pose is used as the pose of the camera when the deviation between their results is large, and the second pose is used as the pose of the camera when their results are similar.

Thread 1 is used for providing an initial pose to thread 2, to correct a poor pose given by thread 2.

Thread 2 is used for better tracking in a complicated background, and can support tracking in a larger scene, in a larger shielding, and in a more complicated background after the initial pose is given. The existing algorithms are well improved.

In turn, the second pose can also be used to determine an ROI (region of interest) for the first pose, making the calculation of first pose more accurate. The threads 1 and 2 complement each other. This cannot be achieved by the original algorithms in tracking away from the marker. This ensures a larger tracking range and more accurate results.

Figure 3:
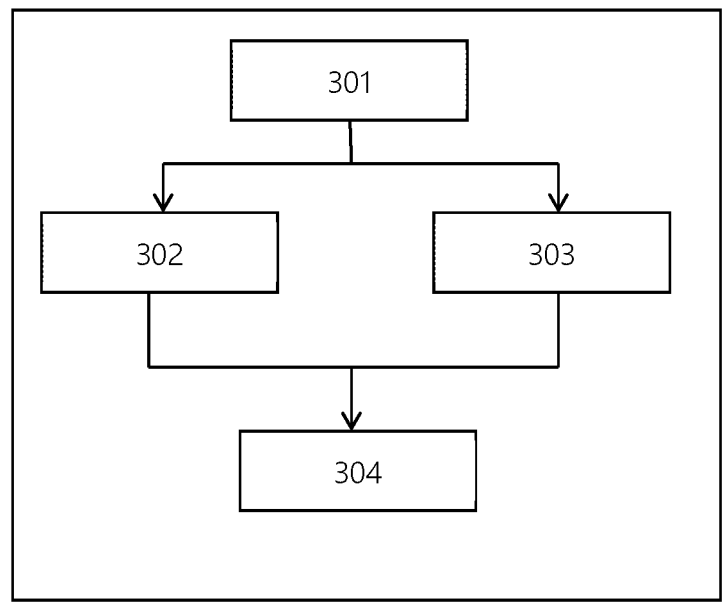
FIG. 3 is a block diagram showing a device for determining a pose of a camera according to a third embodiment of the present disclosure.

A device for determining a pose of a camera according to another embodiment of the present disclosure is described below with reference to FIG. 3. As shown in FIG. 3, the device includes a unit 301 configured to acquire an image of a marker; a unit 302 configured to estimate a first pose of the camera according to the image of the marker by using a characteristic point method (the implementation thereof is for example identical or similar to the step S102 of FIG. 1); a unit 303 configured to estimate a second pose of the camera according to the image of the marker by using a direct method (the implementation thereof is for example identical or similar to the step S103 of FIG. 2); and a unit 304 configured to determine the pose of the camera based on the first pose and the second pose (the implementation thereof is for example identical or similar to the step S104 of FIG. 1).

According to a variation of the disclosure, the unit 304 is configured to determine the second pose of the camera as the pose of the camera, in a case that a deviation between the first pose and the second pose is less than a preset threshold; and determine the first pose of the camera as the pose of the camera, in a case that the deviation between the first pose and the second pose is greater than the preset threshold.

According to a variation of the disclosure, the unit 304 is configured to determine the pose of the camera by weighting the first pose and the second pose.

According to a variation of the disclosure, the device further includes a unit configured to determine whether the first pose and the second pose are available respectively.

According to a variation of the disclosure, the unit configured to determine whether the first pose and the second pose are available respectively is configured to determine whether the first pose is available by calculating a point-to-point re-projection error, and to determine whether the second pose is available by calculating a photometric error. Preferably, if the second pose is unavailable, the first pose of the camera is taken as an initialized pose of the camera for use by the unit 303.

According to a variation of the disclosure, the unit 303 is configured to determine a region of interest based on the second pose, and the unit 302 is configured to estimate the first pose of the camera in the region of interest.

According to a variation of the disclosure, the marker is a planar marker, and the device further includes a unit configured to perform characteristic extraction and characteristic training on a template image of the marker.

According to a variation of the disclosure, the unit 302 is configured to match a characteristic point of the image of the maker to a characteristic point of the template image of the maker, to estimate the first pose of the camera.

According to a variation of the disclosure, the marker is a three-dimensional marker, and the unit 302 is configured to match the image of the maker to a characteristic template of the maker, to estimate the first pose of the camera.

Figure 4:
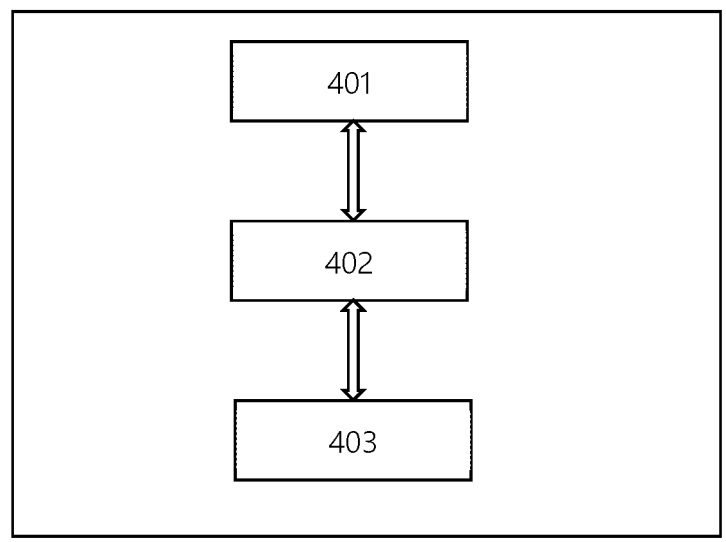
FIG. 4 is a block diagram showing a device including a camera according to a fourth embodiment of the present disclosure.

A device according to further another embodiment of the present disclosure is described below with reference to FIG. 4. The device includes: a camera 401; a processor 402, the processor being in communication with the camera and being able to receive or access an image captured by the camera; and a memory 403 including computer executable instructions stored thereon. These instructions may include one or more executable instructions that enable the processor to implement the following processing: S101, acquiring an image of a marker captured by the camera; S102, estimating a first pose of the camera according to the image of the marker by using a characteristic point method; S103, estimating a second pose of the camera according to the image of the marker by using a direct method; and S104, determining the pose of the camera based on the first pose and the second pose. According to a variation of the disclosure, the image captured by the camera 401 may be stored in the memory 403 firstly, and then accessed by the processor 402 when the processor 402 executes the computer executable instructions stored in the memory 403. The device in this embodiment may be a single integrated device, such as a user's mobile phone, PAD, PDA, laptop, etc., or may be a system composed of different components. For example, the camera 401 may be separate from the processor 402 and the memory 403, but is communicatively coupled with them, such that the processor 402 can receive or access images captured by camera 401 and further identify the pose of the camera 401. All these are within the scope of the disclosure as defined by the claims.

Figure 5:
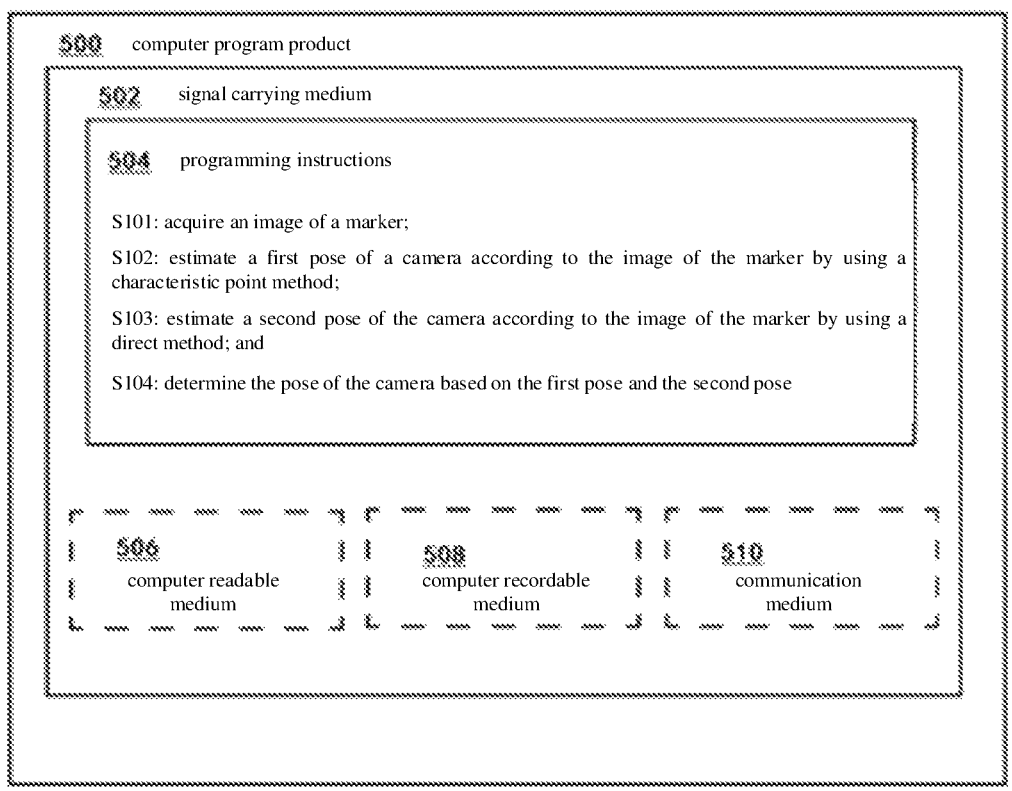
FIG. 5 is a block diagram of a computer program product configured in accordance with at least some embodiments of the present disclosure.

FIG. 5 is a block diagram of a computer program product 500 configured in accordance with at least some embodiments of the present disclosure. The signal carrying medium 502 can be implemented as or includes a computer readable medium 506, a computer recordable medium 508, a computer communication medium 510, or a combination thereof. The signal carrying medium 502 stores programming instructions 504 that can configure a processing unit to perform all or some of the previously described processes. The instructions may include one or more executable instructions that for example enable one or more processors to implement the following processing: S101, acquiring an image of a marker; S102, estimating a first pose of a camera according to the image of the marker by using a characteristic point method; S103, estimating a second pose of the camera according to the image of the marker by using a direct method; and S104, determining the pose of the camera based on the first pose and the second pose.

Although various examples of the device and/or process have been set forth in the foregoing detailed description through the block diagrams, flowcharts and/or the use of examples, such block diagrams, flowcharts and/or examples contain one or more functions and/or operations, and those skilled in the art will appreciate that each of the functions and/or operations within such block diagrams, flowcharts or examples can be implemented individually and/or collectively by a variety of hardware, software, firmware, or substantially any combination thereof. In one example, portions of the subject matter described herein may be implemented via an application specific integrated circuit (ASIC), a field programmable gate array (FPGA), a digital signal processor (DSP), or other integrated forms. However, those skilled in the art will appreciate that some aspects of the examples disclosed herein may be equally implemented, in whole or in part, in an integrated circuit, as one or more computer programs running on one or more computers. (e.g., implemented as one or more programs running on one or more computer systems), as one or more programs running on one or more processors (e.g., implemented as one or more programs running on one or more microprocessors), as firmware, or as almost any combination of the above. Moreover, in accordance with the disclosure, designing circuits and/or writing codes for the software and/or firmware will be within the range of skills of those skilled in the art. For example, if the user determines that speed and accuracy are important, the user can select the primary hardware and/or firmware media; if flexibility is important, the user can select the implementation of primary software; or alternatively, the user can select a combination of hardware, software, and/or firmware.

Additionally, those skilled in the art will appreciate that the mechanisms of the subject matter described herein can be distributed as various forms of program products, and each of the illustrative examples of the subject matter described herein applies, regardless of the specific type of signal carrying medium actually used to implement the distribution. Examples of signal carrying medium include, but are not limited to: recordable media such as a floppy disc, a hard disc drive, a compact disc (CD), a digital video disc (DVD), a digital tape, a computer memory, etc.; and transporting media such as digital and/or analog communication media (e.g., fiber optic cable, waveguide, wired communication link, wireless communication link, etc.).

Those skilled in the art will appreciate that a device and/or a process are generally described in the art in the manner set forth herein, and thereafter the described device and/or process are integrated into a data processing system by using engineering practice. That is, at least a portion of the device and/or process described herein can be integrated into a data processing system with a reasonable amount of experimentation. Those skilled in the art will appreciate that a typical data processing system generally includes one or more of the following: a housing of a unit in a system, a video display device, a memory such as a volatile memory and a non-volatile memory, a processor such as a microprocessor and a digital signal processor, a computing entity such as an operating system, a driver, a graphical user interface, an application, one or more interactive devices such as a touchpad or a touch screen, and/or a control system including a feedback loop and a control motor (e.g., feedback for sensing a position and/or a speed; a control motor for moving and/or adjusting components and/or quantities). A typical data processing system can be implemented using any suitable commercially available components, such as those commonly found in data computing/communication systems and/or network computing/communication systems.

It should be noted that the above description refers to only preferred embodiments of the present disclosure and is not intended to limit the present disclosure. Although the present disclosure has been described in detail with reference to the foregoing embodiments, modifications may be made by those skilled in the art to the technical solutions recorded in the foregoing various embodiments, or some of the technical features may be equivalently replaced. Any modification, equivalent substitution, improvement or the like made within the spirit and scope of the present disclosure are intended to be included in the scope of protection of the present disclosure.

What is claimed is:

1. A method for determining a pose of a camera, the method comprising:
   S101: acquiring an image of a marker;
   S102: estimating a first pose of the camera according to the image of the marker by a characteristic point method;
   S103: estimating a second pose of the camera according to the image of the marker by a direct method; and
   S104: determining the pose of the camera based on the first pose and the second pose, wherein the S104 comprises determining the second pose of the camera as the pose of the camera, in a case that a deviation between the first pose and the second pose is less than a preset threshold; and determining the first pose of the camera as the pose of the camera, in a case that the deviation between the first pose and the second pose is greater than the preset threshold.

2. The method according to claim 1, wherein the S104 comprises: determining the pose of the camera by weighting the first pose and the second pose.

3. The method according to claim 1, further comprising: determining whether the first pose and the second pose are available respectively.

4. The method according to claim 3, wherein the determining whether the first pose and the second pose are available respectively comprises:
determining whether the first pose is available by calculating a point-to-point re-projection error; and
determining whether the second pose is available by calculating a photometric error.

5. The method according to claim 4, further comprising: determining the first pose of the camera as an initialized pose of the camera and estimating the second pose of the camera by the direct method based on the initialized pose, in a case that the second pose is unavailable.

6. The method according to claim 1, further comprising:
determining a region of interest based on the second pose; and
estimating the first pose of the camera in the region of interest.

7. The method according to claim 1, wherein the marker is a planar marker, and the method further comprises: performing characteristic extraction and characteristic training on a template image of the marker.

8. The method according to claim 7, wherein the S102 comprises: matching a characteristic point of the image of the marker to a characteristic point of the template image of the marker, to estimate the first pose of the camera.

9. The method according to claim 1, wherein the marker is a three-dimensional marker, and the S102 comprises: matching the image of the marker to a characteristic template of the marker, to estimate the first pose of the camera.

10. A non-transitory computer readable storage medium comprising computer executable instructions stored thereon, wherein the computer executable instructions, when executed by a processor, implement the method according to claim 1.

11. A device for determining a pose of a camera, the device comprising:
a camera;
a processor, which is in communication with the camera and is able to receive or access an image captured by the camera; and
a memory comprising computer executable instructions stored thereon, wherein the computer executable instructions, when executed by the processor, enable the processor to:
acquire an image of a marker;
estimate a first pose of the camera according to the image of the marker by a characteristic point method;
estimate a second pose of the camera according to the image of the marker by a direct method; and
determine the pose of the camera based on the first pose and the second pose, and
determine the second pose of the camera as the pose of the camera, in a case that a deviation between the first pose and the second pose is less than a preset threshold; and
determine the first pose of the camera as the pose of the camera, in a case that the deviation between the first pose and the second pose is greater than the preset threshold.

12. The device according to claim 11, wherein the computer executable instructions, when executed by the processor, enable the processor to determine the pose of the camera by weighting the first pose and the second pose.

13. The device according to claim 11, wherein the computer executable instructions, when executed by the processor, enable the processor to determine a region of interest based on the second pose, and estimate the first pose of the camera in the region of interest.

14. The device according to claim 13, wherein the computer executable instructions, when executed by the processor, enable the processor to match a characteristic point of the image of the marker to a characteristic point of the template image of the marker, to estimate the first pose of the camera.

* * * * *